United States Patent
Murphy

[11] 3,774,477
[45] Nov. 27, 1973

[54] GEAR MOTOR
[76] Inventor: David M. Murphy, 602 2nd Street, N.W., Mason, City, Iowa
[22] Filed: Dec. 30, 1971
[21] Appl. No.: 214,068

[52] U.S. Cl. .............................. 74/801, 188/82.77
[51] Int. Cl. .... F16h 1/36, F16h 57/08, F16d 41/12
[58] Field of Search ...................... 74/801, 802, 803, 74/799; 308/203; 188/82.77

[56] References Cited
UNITED STATES PATENTS

| | | | |
|---|---|---|---|
| 568,233 | 9/1896 | Box | 188/82.77 |
| 1,707,877 | 4/1929 | Roberts | 74/801 |
| 1,908,905 | 5/1933 | Landahl | 188/82.77 |
| 1,945,361 | 1/1934 | Ball | 74/801 |
| 2,033,749 | 3/1936 | Walter | 74/801 X |
| 2,257,609 | 9/1941 | Kollath | 308/203 X |
| 3,265,362 | 8/1966 | Moody | 74/801 X |

Primary Examiner—Charles J. Myhre
Assistant Examiner—Thomas C. Perry
Attorney—Robert T. Edell et al.

[57] ABSTRACT

A motor assembly has a rotary motor shaft which is connected to drive a planetary gear system in a first gear assembly and impart rotational movement to a rotating output shaft of the first gear assembly at a ratio different from that of the motor assembly. The rotating output shaft of the first gear assembly is mounted in coaxial relation to the rotary motor shaft of the motor assembly and one or more additional gear assemblies, each having like components with respect to the first gear assembly and further having a drive gear on the rotating output shaft of each thereof, may be interposed between the motor assembly and the first gear assembly to further vary the speed of rotation between the rotary motor shaft of the motor assembly and the rotary output shaft of the first gear assembly.

5 Claims, 6 Drawing Figures

PATENTED NOV 27 1973 3,774,477
SHEET 1 OF 2
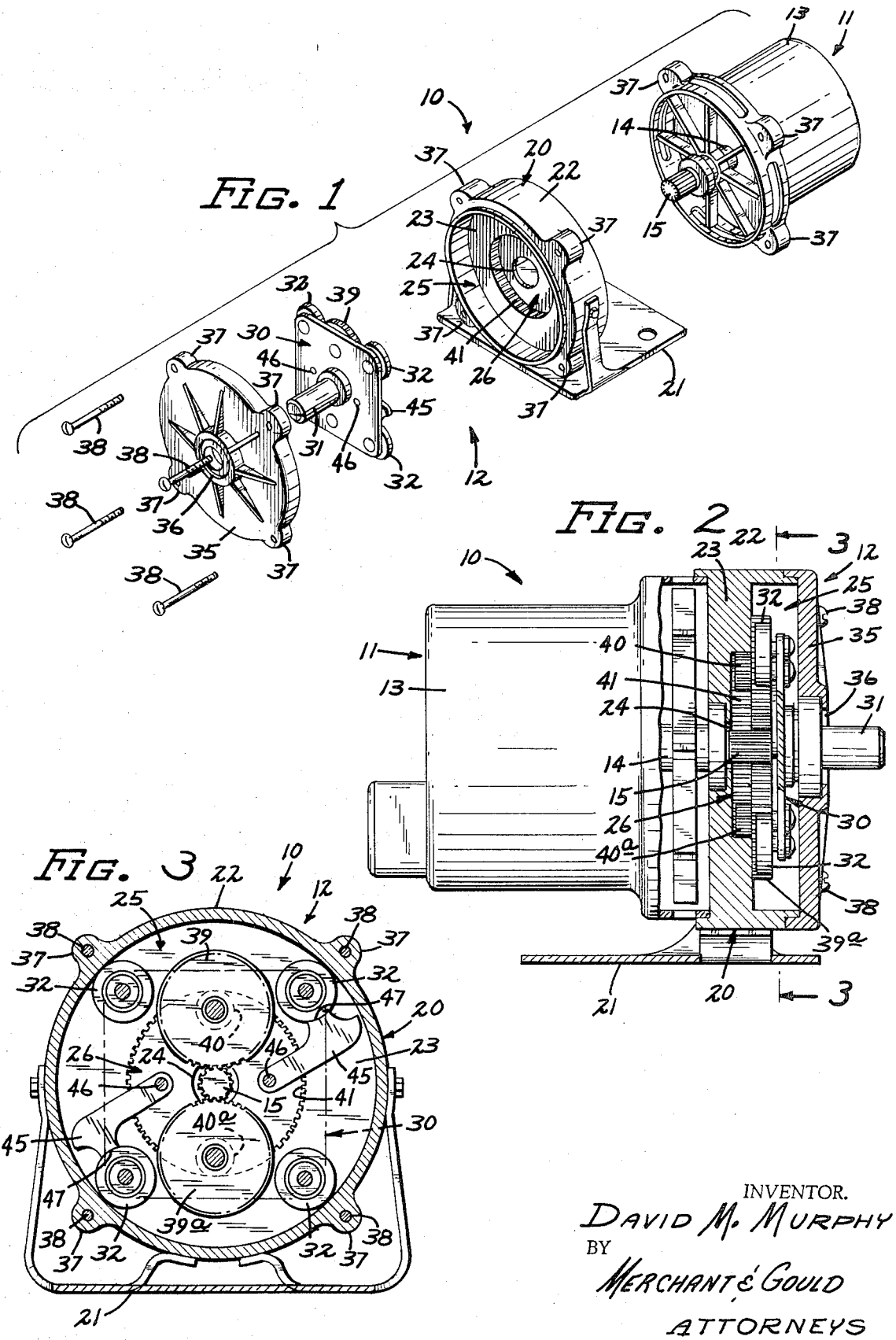
INVENTOR.
DAVID M. MURPHY
BY
MERCHANT & GOULD
ATTORNEYS

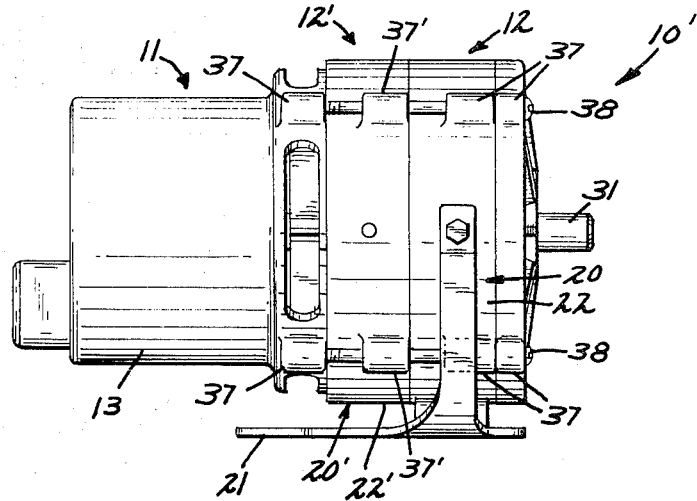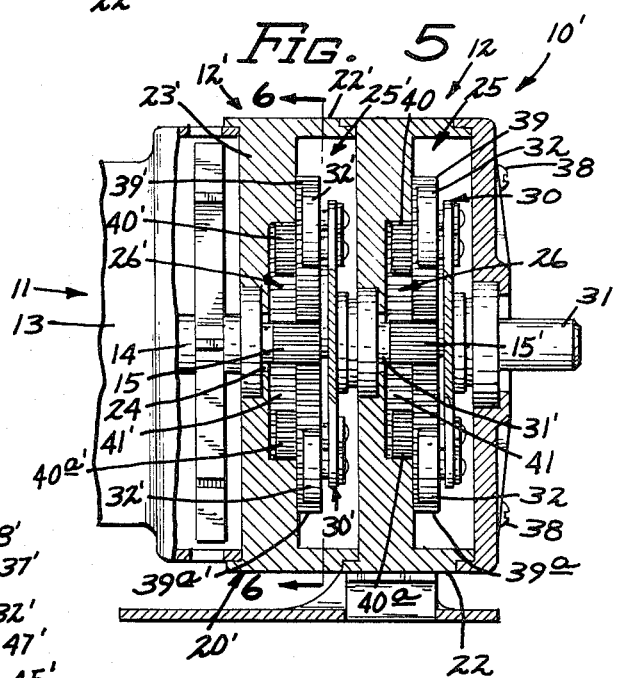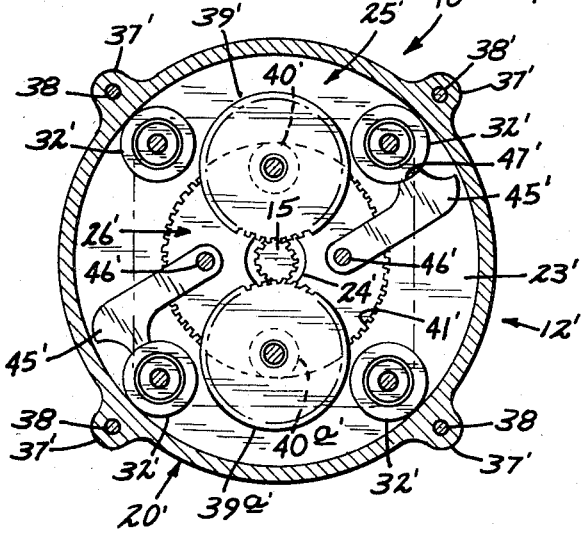

3,774,477

GEAR MOTOR

FIELD OF THE INVENTION

The present invention pertains generally to gear motors and more specifically to gear motors employing planetary gear systems.

DESCRIPTION OF THE PRIOR ART

A variety of prior art gear motors are described in patents which utilize elaborate gear train systems and/or other mechanisms for varying the rotational output of the gear motor and thus, the torque output at the rotating output shaft of the gear motor. Such gear motors are extremely complicated and expensive to manufacture and thus, their use is not generally economically feasible in such highly competitive fields as the manufacture of farm implements, for example. Further, in more simplified prior art gear motors, no provision is made wherein the ratio of the rotational speed of the output shaft of the gear assembly may be easily varied with respect to the rotational speed of the motor assembly without considerable modification of the gear assembly. In either case, such prior art gear motors have not only been economically feasible in many fields of manufacture, but have been rather inflexible with respect to their application to devices upon which they are to be used.

SUMMARY OF THE INVENTION

With the above in mind, a gear motor is provided which includes a motor assembly having a rotating motor shaft projecting from one end thereof and a drive gear connected to the motor shaft. A gear assembly having a first and second planetary gear and a fixed ring gear is connected to one end of the motor assembly. A carriage plate having a rotating output shaft extending from one side thereof is mounted in the gear assembly for rotation on an axis coaxial with respect to the rotating motor shaft of the motor assembly, and the first and second planetary gears are mounted on the other side of the carriage plate for rotation on a common axis extending parallel to the output shaft of the gear assembly. One of the first and second planetary gears is in engagement with the ring gear and the other of the first and second planetary gears is in engagement with the drive gear to vary the speed of rotation of the output shaft of the gear assembly with respect to the rotating motor shaft of the motor assembly. At least one additional gear assembly having like formed components with respect to the first gear assembly and further including a drive gear fixedly mounted on the output shaft thereof, may be interposed between the motor assembly and the first gear assembly, in pancake fashion, with the drive gear of the motor shaft having meshing engagement with one of the first and second planetary gears of the additional gear assembly and the drive gear on the output shaft of the additional gear assembly having meshing engagement with one of the first and second planetary gears of the first gear assembly to further vary the speed of rotation of the output shaft of the first gear assembly with respect to the rotary motor shaft of the motor assembly.

It is a primary object of the present invention to provide a gear motor which is simple in construction, relatively inexpensive to manufacture, and which is easily adaptable to a variety of uses;

It is a further object of the present invention to provide a device of the above character which is durable throughout extended periods of use;

A still further object of the present invention is the provision of a device of the character above described which may be easily converted to provide different rotational speeds at the output shaft thereof with a minimum of labor and with a minimum of skill.

These and other objects of this invention will become apparent to those skilled in the art upon consideration of the accompanying specification, claims and drawings.

BRIEF DESCRIPTION OF THE DRAWINGS

Referring to the drawings, wherein like characters indicate like parts throughout the several figures;

FIG. 1 is a view in exploded perspective of a motor assembly and a gear assembly illustrating the inventive principles of the present invention;

FIG. 2 is an enlarged view in side elevation of the structure of FIG. 1 in an assembled condition, portions thereof being broken away and shown in section;

FIG. 3 is a view in transverse section as seen from the line 3—3 of FIG. 2;

FIG. 4 is a side elevational view, on a reduced scale, of a gear motor illustrating the interposing of an additional gear assembly in pancake fashion to further vary the rotational speed of the output shaft thereof;

FIG. 5 is an enlarged fragmentary view of the structure of FIG. 4 partially in side elevation and partially in axial section; and FIG. 6 is a transvers sectional view as seen generally from the line 6—6 of FIG. 5.

DESCRIPTION OF THE PREFERRED EMBODIMENTS

Referring initially to FIGS. 1-3, a gear motor constructed in accordance with the present invention is indicated generally by the numeral 10 and comprises a motor assembly 11 and a gear assembly 12. Motor assembly 11 is shown as a conventional electric motor having the usual parts, not shown, but mounted within the housing 13 and a fan-equipped rotary motor shaft 14 projecting from one end thereof. A drive gear 15 is fixedly mounted on the outer end of the motor shaft 14.

Gear assembly 12 includes a housing 20 formed with a base 21 for mounting same to a supporting surface, or machine, not shown. Housing 20 of gear assembly 12 is shown as having a cylindrical side wall and a transverse end wall 23 which is formed with a central opening 24. The wall portions 22 and 23 cooperate to define a recess indicated at 25 and a counter recess indicated at 26, each of the recesses 25, 26 having a radially inwardly facing peripheral surface, the use of which will become more apparent hereinafter.

A carriage plate 30 has a rotating output shaft 31 extending from one side thereof and means is provided for mounting same in the recess 25 of the housing 20 for rotation of the output shaft 31 on an axis coaxial with respect to the rotating motor shaft 14. Such means includes a plurality of guide rollers 32 rotatably mounted on the side of the carriage plate 30 opposite the output shaft 31 and on axes extending parallel to the axis of shaft 31. Rollers 32 are each rotatably mounted so that the peripheral edges thereof extend outwardly of the perimeter of the carriage plate 30 and engages the radially inwardly facing surface of the recess 25. As shown particularly well in FIG. 2 and 3 of the drawings, assembly of the motor assembly 11 and gear assembly 12 positions the drive gear 15 within the central opening 24 in the wall 23 so as to be positioned partially in the recess 25 for reasons which will become apparent hereinafter. Forming an additional support for the carriage 30 and output shaft 31 is an end cap 35 having a bearing equipped central opening 36 which journals the shaft 31. The bearing in opening 36, together with the guide rollers 32, securely supports carriage 30 for rotation in recess 25.

As seen in FIG. 1, each of the motor assembly 11, housing 20 and end cap 35 are provided with axially aligned, radially outwardly extending ears 37. Ears 37 of portions 20 and 35 are provided with openings for the sliding reception of anchoring bolts 38 while openings in the ears 37 of motor assembly 11 have threaded engagement with the anchoring bolts 38 so as to rigidly position the parts 11, 20 and 35 in the axially aligned positions of FIGS. 2 and 3.

Gear assembly 12 is of a type employing a planetary gear system to vary the speed of rotation of shaft 31 relative to motor shaft 14. The preferred embodiment of the present includes a plurality of pairs of first and second planetary gears 39, 40 and 39a, 40a. Each pair of first and second planetary gears 39, 40 and 39a, 40a is mounted for common rotation of each pair on the other or same side of carriage 30 as the rollers 32 and on axes which extend parallel to and are diametrically spaced relative to the axis of output shaft 31. The planetary gear system further includes a ring gear 41 which is formed in the radially inwardly directed face of the counter recess 26. As shown, particularly in FIG. 3 of the drawings, the first planetary gear 39, 39a of each pair of planetary gears has meshing engagement with the drive gear 15 affixed to rotating motor shaft 14 and each second gear 40, 40a has meshing engagement with the ring gear 41 formed in the counter recess 26. In this manner, rotation of the rotating motor shaft 14 of the electrical motor assembly 11 and drive gear 15 in a clockwise direction imparts rotational movement to the first and second planetary gears 39, 40 and 39a, 40a in a counterclockwise direction. Such rotational movement of secondary gears 40, 40a causes these gears to rotate in a clockwise direction with respect to the ring gear 41 and thus, the axes on which the gears 39, 40 and 39a, 40a are mounted, together with the carriage plate 30, move in a clockwise direction as viewed from FIG. 3. Due to the particular gear ratios employed, rotation of the shaft 14 at a given speed results in rotation of the output shaft 31 at a reduced speed.

In many instances, the particular application of a gear motor requires an output shaft having a different rotational output speed. To overcome the objections of known prior art devices herein previously discussed, the above-described structure is modified in the manner hereinafter described and illustrated in FIGS. 4-6 of the drawings. The particular modification of the gear motor 10' hereinafter described will result in a further reduced rotational speed of the output shaft 31 of the gear assembly 12 and is comprised of at least one additional gear assembly 12' interposed in pancake fashion between the motor assembly 11 and the first gear assembly 12, as particularly shown in FIGS. 4, 5. The additional gear assembly 12' includes like formed components with respect to the first gear assembly 12 and, therefore, such components will carry like numerals with a prime (') mark added to differentiate same from the first gear assembly 12. Like first gear assembly 12, additional gear assembly 12' includes a housing 20' having a cylindrical wall 22' and a transverse wall 23' formed with the central opening 24'. Also, like wall portions 22 and 23 of gear assembly 12, wall portions 22', 23' of gear assembly 12' cooperate to define a recess indicated at 25' and a counter recess indicated at 26'. A carriage plate 30', having a rotating output shaft 31' extending from one side thereof, is mounted in the recess 25' for rotation of the output shaft 31' on an axis coaxial with respect to the rotating motor shaft 14 in a manner identical to that of carriage plate 30 of gear assembly 12. In addition, gear assembly 12' further includes a drive gear 15' fixedly mounted on the output shaft 31' thereof. As shown particularly well in FIG. 5 of the drawings, gear assembly 12' is interposed in pancake fashion between the motor assembly 11 and first gear assembly 12 with the drive gear 15 of motor shaft 14 having meshing engagement with the first planetary gears 39', 39a' of the additional gear assembly 12' and the drive gear 15' on the output shaft 31' of the additional gear assembly 12' in meshing engagement with the first planetary gears 39, 39a of the first gear assembly 12. The second planetary gears 40, 40a and 40', 40a' having meshing engagement with their respective ring gears 41, 41'.

As can be appreciated by those skilled in the art, the above arrangement of parts will virtually halve the rotational output of the output shaft 31 with respect to that of the structure of FIG. 1. It can further be seen that the above has been accomplished without any substantial or expensive altering of the structure of FIG. 1 with the exception of a slight increase in the axial dimension thereof. Also, it will be appreciated by those skilled in the art that further speed reductions of the output shaft 31 may be made by the pancaking of further additional gear assembly units 12' in a manner similar to that heretofore described.

When it is desired to limit or restrict movement of the output shaft 31 in a reverse direction, mechanism may be provided in the gear assembly 12 which includes a plurality of stop dogs 45, that are pivotally mounted on the same side of the carriage plate as the guide rollers 32 and on pivotal axes 46 which extend parallel to the output shaft 31. Each of the stop dogs 45 extends transversely outwardly from the pivotal axis 46 thereof past the perimeter of the carriage plate 30 and is of a length such that as each of the stop dogs is rotated in one direction about its respective pivot axis 46, an end of one of the stop dogs 45 will contact the radially inwardly facing surface of the recess 25 under the action of gravity and limit or restrict rotary movements of the carriage plate 30 in an opposite direction (a counterclockwise direction with respect to FIG. 3). Each of the stop dogs 45 also includes a bearing surface 47 which is positioned to be engageable with an adjacent guide roller 32 when a respective stop dog 45 is rotated in an opposite direction about its pivot axis 46 or when the carriage plate 30 is rotating in a clockwise direction with respect to FIG. 3. In this manner, the extreme end of each of the stop dogs 45 is maintained in a position adjacent the inwardly facing surface of the recess 25 so as to coact therewith and prevent counterclockwise or reverse movement of the carriage plate 30, output shaft 31 and parts driven thereby (not shown) as above-described. Each of the additional gear assemblies 12' which may be employed also includes stop dogs 45 which are all constructed and operate in a manner identical to stop dogs 45.

While I have shown and described specific embodiments of this invention, further modifications and improvements will occur to those skilled in the art. I desire it to be understood, therefore, that this invention is not limited to the particular forms shown and I intend in the appended claims to cover all modifications which do not depart from the spirit and scope of this invention.

I claim:

1. A gear motor comprising:
   a. a motor assembly having a drive gear equipped rotating motor shaft projecting from one end thereof;
   b. a gear assembly coaxially connected to said one end of said motor assembly said gear assembly including:
      1. a housing having a cylindrical sidewall portion and a transverse wall portion formed with a central opening, said wall portions cooperating to define a recess and a counter-recess having radially inwardly facing surfaces;
      2. a ring gear formed in said inwardly facing surface of said counter recess;
      3. a plurality of pairs of first and second planetary gears disposed in said recess and counter-recess;
      4. a relatively thin carriage plate having a rotating output shaft extending from one side thereof and mounting said pairs of first and second planetary gears for common rotation at equally spaced circumferential points on the other side thereof, each of said first planetary gears having meshing engagement with said drive gear and each of said secondary planetary gears having meshing engagement with said ring gear;
   c. an end cap secured to said motor and gear assemblies and mounting said output shaft for rotation coaxially with said motor shaft; and
   d. a plurality of guide rollers rotatably mounted on said carriage in a common plane with said first planetary gears to extend outwardly from said carriage plate at equally spaced circumferential positions and engage said inwardly facing surface of said recess.

2. The structure of claim 1 in which said gear motor comprises a first gear assembly and at least one additional gear assembly coaxially interposed in pancake fashion between said motor assembly and said first gear assembly without altering the construction thereof:
   a. said additional gear assembly having like formed components with respect to said first gear assembly and further including a drive gear mounted on the output shaft thereof;
   b. said drive gear of said motor shaft having meshing engagement with said first planetary gears of said additional gear assembly and said drive gear on said output shaft of said additional gear assembly having meshing engagement with said first planetary gears of said first gear assembly.

3. The structure of claim 1 in further combination with at least one stop dog mounted on said carriage plate for pivotal movement about an axis extending parallel to the axis of said output shaft and in a common plane with said first planetary gears and guide rollers, said stop dog extending transversely outwardly from said pivotal axis past the perimeter of said carriage plate and being a length such that as said stop dog is rotated in one direction about its pivot axis the end of said stop dog will contact said inwardly facing surface of said recess whereby to preclude rotary movement of said carriage plate in one direction.

4. The structure of claim 3 in which said stop dog includes a bearing surface engageable with one of said guide rollers when said stop dog is rotated in an opposite direction about its pivot axis.

5. The structure of claim 4 in further combination with a plurality of stop dogs pivotally mounted on said carriage plate in a radially and circumferentially equally spaced relationship.

* * * * *